US 8,206,572 B2

(12) United States Patent
Wang et al.

(10) Patent No.: US 8,206,572 B2
(45) Date of Patent: Jun. 26, 2012

(54) SYSTEMS, METHOD AND APPARATUS FOR REDUCING IMPURITIES IN ELECTROLYSIS CELLS

(75) Inventors: Xiangwen Wang, Murrysville, PA (US); Gary Tarcy, Murrysville, PA (US)

(73) Assignee: Alcoa Inc., Pittsburgh, PA (US)

( * ) Notice: Subject to any disclaimer, the term of this patent is extended or adjusted under 35 U.S.C. 154(b) by 520 days.

(21) Appl. No.: 12/432,527

(22) Filed: Apr. 29, 2009

(65) Prior Publication Data

US 2010/0275732 A1 Nov. 4, 2010

(51) Int. Cl.
C25C 5/00 (2006.01)
(52) U.S. Cl. ........... 205/391; 205/560; 210/633; 75/674
(58) Field of Classification Search .................. 205/391, 205/560; 210/633; 75/674; 204/242
See application file for complete search history.

(56) References Cited

U.S. PATENT DOCUMENTS

| | | | |
|---|---|---|---|
| 4,525,181 A * | 6/1985 | Bockman | 95/131 |
| 2005/0163688 A1 | 7/2005 | Bade et al. | 423/111 |

OTHER PUBLICATIONS

Haugland, E., et al., "The Behaviour of Phosphorus Impurities in Aluminium Electrolysis Cells," *TMS Light Metals 2001*, pp. 549-553.
Liu, X., et al., "Distribution of Impurities in Reduction Cells," *Proc. 4th Aust. Al Smelting Workshop 1992*, pp. 457-473.
Lossius, P., et al., "Removing Impurities from Secondary Alumina," *(Research Summary) JOM*, Nov. 1991, pp. 41-45.
Lossius, P., et al., "Removing Impurities from Secondary Alumina Fines," *1992 TMS Annual Meeting*, San Diego, California, Mar. 1-5, 1992, pp. 249-258.
Schuh, L., et al., "Removal of Impurities from Dry Scrubbed Fluoride Enriched Alumina," *TMS Light Metals 1996*, pp. 399-403.
Sillinger, N., et al., "Iron and Silicon Impurities in the Process of Aluminium Electrolysis," *TMS Light Metals 1990*, pp. 369-376.
Sturm, E. et al., "Removing Impurities from the Aluminium Electrolysis Process," *The 127th TMS Annual Meeting: Light Metals*, San Antonio, Texas, USA, Feb. 15-19, 1998, pp. 235-240.
Wedde, G. et al., "Potential Impact on Electrolysis from Removal of Impurities from Enriched Alumina," *Proc. 6th Aust. Al Smelting Workshop 1998*, pp. 627-638.

* cited by examiner

*Primary Examiner* — Harry D Wilkins, III
*Assistant Examiner* — Zulmariam Mendez
(74) *Attorney, Agent, or Firm* — Greenberg Traurig, LLP (57) ABSTRACT

Systems, methods and apparatus for reducing impurities in electrolysis cells are disclosed. In one approach, a method includes feeding a particulate fines feed stream to a tank, mixing particulate fines (PF) with liquid, the liquid having a first liquid and a second liquid, and separating at least some of the first liquid from at least some of the second liquid. The particulate fines (PF) may include inlet carbon fines ($CF_I$) and inlet recyclable fines ($RF_I$). The first liquid may include a recovered recyclable fines portion ($RF_1$), and the second liquid may include a waste carbon fines portion ($CF_1$). The mass ratio of the recovered recyclable fines portion ($RF_1$) to the inlet recyclable fines ($RF_I$) may be at least about 0.5. The mass ratio of the waste carbon fines portion ($CF_1$) to the inlet carbon fines ($CF_I$) may be at least about 0.1.

18 Claims, 4 Drawing Sheets

$PF_I = RF_I + CF_I + I_I$ $RF_O = RF_1 + CF_2 + I_2$ $CF_O = CF_1 + RF_2 + I_1$ $RF_I = RF_1 + RF_2$ $CF_I = CF_1 + CF_2$ $I_I = I_1 + I_2$ $\dfrac{RF_1}{RF_I} \geq 0.5$ $\dfrac{CF_1}{CF_I} \geq 0.1$ $\dfrac{I_2}{I_I} \leq 0.75$

SYSTEMS, METHOD AND APPARATUS FOR REDUCING IMPURITIES IN ELECTROLYSIS CELLS

BACKGROUND

Aluminum and other metals, such as lead, magnesium, zinc, zirconium, titanium and silicon may be produced via electrolysis. With respect to aluminum, alumina dissolved in molten fluoride bath is electrolyzed at temperature of from about 900° C. to about 1000° C. to produce aluminum metal.

Figure 1:
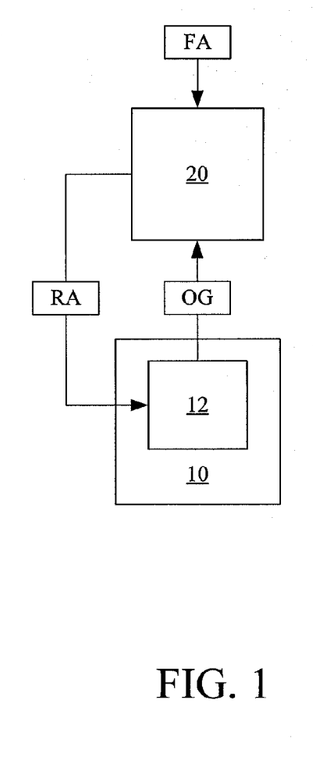
FIG. 1 is a schematic view illustrating conventional systems and methods for treating aluminum electrolysis cell off-gases.

One conventional system for producing aluminum is illustrated in FIG. 1. A conventional potline 10 includes a plurality of aluminum electrolysis cells 12. Each of these electrolysis cells 12 produces aluminum metal via conventional electrolytic processes. During metal production, the electrolysis cells 12 produce fumes, generally referred to as off-gases (OG), which are sent to a gas treatment center 20.

The off-gases (OG) generally include gaseous fluoride (e.g., HF) and bath fines (BF), which contain $NaAlF_4$. Gaseous fluoride is readily removed from the off-gases (OG) by contacting it with fresh alumina (FA) in the gas treatment center 20 (e.g., via use of a dry scrubber) to produce reacted alumina (RA), which is then sent back to the potline 10 for use as a feed stream to the electrolysis cells 12.

The off-gases (OG) may include other elements, such as, Fe, S, P, Ti, V and Ga, to name a few, which are often associated with small carbon particles contained in the off-gases, generally referred to as carbon fines (CF). The carbon fines (CF) may cause impurity build-up in the electrolysis cells if recycled to the potline 10. Furthermore, in the gas treatment center 20, alumina fines (AF) may be produced due to the feed of the fresh alumina (FA) to the gas treatment center 20. If transported to the electrolysis cells 12, these alumina fines (AF) may cause lower current efficiency in the electrolysis cells 12. Due to the size of the alumina, carbon and bath fines, which generally have an average diameter of not greater than about 20 microns, collection and treatment of these particulate fines is problematic.

SUMMARY OF THE DISCLOSURE

The present disclosure relates to systems, method and apparatus for reducing impurities in electrolysis cells. In one approach, the disclosure relates to removing carbon fines from a particulate mass before that mass is returned to the electrolysis cells. As the carbon fines and the impurities associated therewith may be problematic to the efficient operation of electrolysis cells, their removal may facilitate reduced impurities within the electrolysis cell and improved operation of the electrolysis cells.

In one aspect, a method may include (a) feeding a particulate fines feed stream to a tank, (b) mixing particulate fines (PF) with liquid, the liquid having a first liquid and a second liquid, and (c) separating at least some of the first liquid from at least some of the second liquid. The particulate fines (PF) may include inlet carbon fines ($CF_I$) and inlet recyclable fines ($RF_I$). The particulate fines (PF) generally have a maximum diameter of not greater than 45 microns. In some embodiments, the particulate fines may have an average diameter of not greater than about 20 microns. The first liquid may include a recovered recyclable fines portion ($RF_1$), and the second liquid may include a waste carbon fines portion ($CF_1$).

The method may facilitate recovery of a high amount of recyclable fines in the particulate mass. In one approach, the mass ratio of the recovered recyclable fines portion ($RF_1$) to the inlet recyclable fines ($RF_I$) may be at least about 0.5. In one embodiment, the mass ratio of the recovered recyclable fines portion ($RF_1$) to the inlet recyclable fines ($RF_I$) is at least about 0.70. Other recyclable fines mass ratios are disclosed below.

The method may facilitate removal of a high amount of carbon fines from the particulate mass. In one approach, the mass ratio of the waste carbon fines portion ($CF_1$) to the inlet carbon fines ($CF_I$) may be at least about 0.1. In one embodiment, the mass ratio of the waste carbon fines portion ($CF_1$) to the inlet carbon fines ($CF_I$) is at least about 0.50. Other carbon fines mass ratios are disclosed below.

The method may facilitate removal of a high amount of impurities from the particulate mass. In one approach, the particulate fines feed stream comprises inlet impurities ($I_I$). Impurities generally included in the particulate fines feed stream include (and in some instances consist of, or consist essentially of) Fe, Ni, V, Ti, S and P. In one embodiment, e.g., after the separating step, the first liquid comprises a recovered impurities portion ($I_2$). In one embodiment, the ratio of the recovered impurities portion $I_2$ to inlet impurities ($I_I$) is not greater than about 0.75. Other impurity mass ratios are disclosed below.

The first and second liquids may have differing densities and/or polarities and/or surface tension properties, to name a few. In one approach, the first liquid is an aqueous liquid, and the second liquid is an organic liquid. In one embodiment, the aqueous liquid is water. In one approach, the organic liquid is a hydrocarbon-based liquid. In one embodiment, the organic liquid is a petroleum-based liquid. In one embodiment, the organic liquid comprises hydrocarbons having a chain length of at least about C9. In one embodiment, the organic liquid comprises hydrocarbons having a chain length of at least about C11. In one embodiment, the organic liquid comprises saturated hydrocarbons. In one embodiment, the organic liquid comprises aromatic hydrocarbons. In one embodiment, the organic liquid comprises unsaturated hydrocarbons. In one embodiment, the organic liquid comprises a mixture of at least two of saturated hydrocarbons, aromatic hydrocarbons, and unsaturated hydrocarbons. In one embodiment, the organic liquid comprises saturated hydrocarbons, aromatic hydrocarbons, and unsaturated hydrocarbons. In one embodiment, the organic liquid includes 50-90 wt. % saturated hydrocarbons. In one embodiment, the organic liquid includes 10-50 wt. % aromatic hydrocarbons. In one embodiment, the organic liquid includes 1-10 wt. % unsaturated hydrocarbons. In one embodiment, the organic liquid includes 70-80 wt. % saturated hydrocarbons, 17-25 wt. % aromatic hydrocarbons and 3-6 wt. % unsaturated hydrocarbons. In one embodiment, the organic liquid includes 54-85 wt. % saturated hydrocarbons, 15-45 wt. % aromatic hydrocarbons and 1-6 wt. % unsaturated hydrocarbons. In one embodiment, the organic liquid comprises at lease one fuel oil. In one embodiment, the fuel oil is at least one of No. 1 Fuel Oil and No. 2 Fuel Oil.

In one approach, the liquid includes an additive. In one embodiment, the additive is at least one of an alcohol, ether, keytone, and combinations thereof. In one embodiment, the additive is an alcohol. In one embodiment, the additive is a carbinol. In one embodiment, the additive is methyl isobutyl carbinol.

In one embodiment, an additive may at least partially facilitate recovery of a high amount of recyclable fines in the particulate mass. In one embodiment, the additive at least facilitates achievement of a $RF_1$:$RF_I$ mass ratio of at least 0.50. In one embodiment, the additive at least facilitates achievement of a $RF_1:RF_I$ mass ratio of at least 0.70. Other recovered fines mass ratios, described below, may be facilitated via the additive.

In one embodiment, an additive may at least partially facilitate removal of a high amount of carbon fines from the particulate mass. In one embodiment, the additive at least facilitates achievement of a $CF_1:CF_I$ mass ratio of at least 0.10. In one embodiment, the additive at least facilitates achievement of a $CF_1:CF_I$ mass ratio of at least 0.50. Other waste carbon mass ratios, described below, may be facilitated via the additive.

In one embodiment, the particulate fines feed stream is an outlet stream of a gas treatment center. For example, a gas treatment center may be associated with one or more aluminum electrolysis cells, and may receive off-gases from at least some of those electrolysis cells. The gas treatment center may also receive fresh alumina (unreacted) from an alumina feed stream for treating the off-gases. In one embodiment, the gas treatment center captures particulate fines (e.g., from an alumina feed stream and/or off-gases), such as in a dust collector, and discharges those particulate fines, as the particulate fines feed stream, to a fines separator. The fines separator may include one or more tanks, each of which is adapted to contain liquid and particulate fines. In one embodiment, a tank is a mixing tank adapted to mix liquid and particulate fines (e.g., to form a slurry or colloid). In one embodiment, a mixing tank is a settling tank, where a first and a second liquid may be allowed to settle and/or separate over time. In one embodiment, a tank is both a mixing tank and a settling tank.

The particulate fines and liquid may be mixed in one or more of the tanks. In one embodiment, the mixing results in a colloid, such as an emulsion of the first liquid and the second liquid. Upon mixing of the particulate fines and the liquid, and concomitant separation of the first liquid from the second liquid, the first liquid may a retain recovered recyclable fines portion, and the second liquid may a retain waste carbon fines portion. In turn, one or more of the tanks may discharge recovered recyclable fines (e.g., via a recyclable fines outlet stream), and waste carbon fines (e.g., via a waste carbon fines outlet stream).

In one embodiment, recycled feedstock is produced from at least some of the recovered recycled fines portion. In this embodiment, the producing may include agglomerating the recovered recyclable fines portion to produce the recycled feedstock. In turn, the recycled feedstock may be supplied to an aluminum electrolysis cell. The agglomerated fines of the recycled feedstock may have an average diameter of at least about 90 microns. The agglomerated fines of the recycled feedstock may have a maximum diameter of not greater than about 160 microns.

In one embodiment, at least some of the waste carbon fines portion is used to facilitate aluminum electrolysis cell operations. For example, the waste carbon fines (e.g., in conjunction with the discharged second liquid), may be used as a fuel. This fuel may be used for heating purposes, such as in the production of pre-baked anodes. Pre-baked anodes are used in some aluminum electrolysis cells to facilitate operation of those aluminum electrolysis cells.

Thus, the instant methods, systems and apparatus facilitate separation of carbon fines from a particulate mass. The instant methods, systems and apparatus facilitate re-use of recyclable fines, such as alumina fines and bath fines, due to the removal of at least some of the carbon fines and associated impurities. The instant methods, systems and apparatus facilitate re-use of carbon fines as a fuel during aluminum electrolysis cell operations. In turn, discharge of waste to the environment may be reduced and/or restricted and/or eliminated.

Various ones of the inventive aspect, approaches, and embodiments described above may be combined to yield various useful systems, methods, and apparatus for removing impurities and/or carbon fines from a particulate mass, and/or reducing impurities in aluminum electrolysis cells.

DETAILED DESCRIPTION

Reference will now be made in detail to the accompanying drawings, which at least assist in illustrating various pertinent features of the present disclosure.

Figure 2:
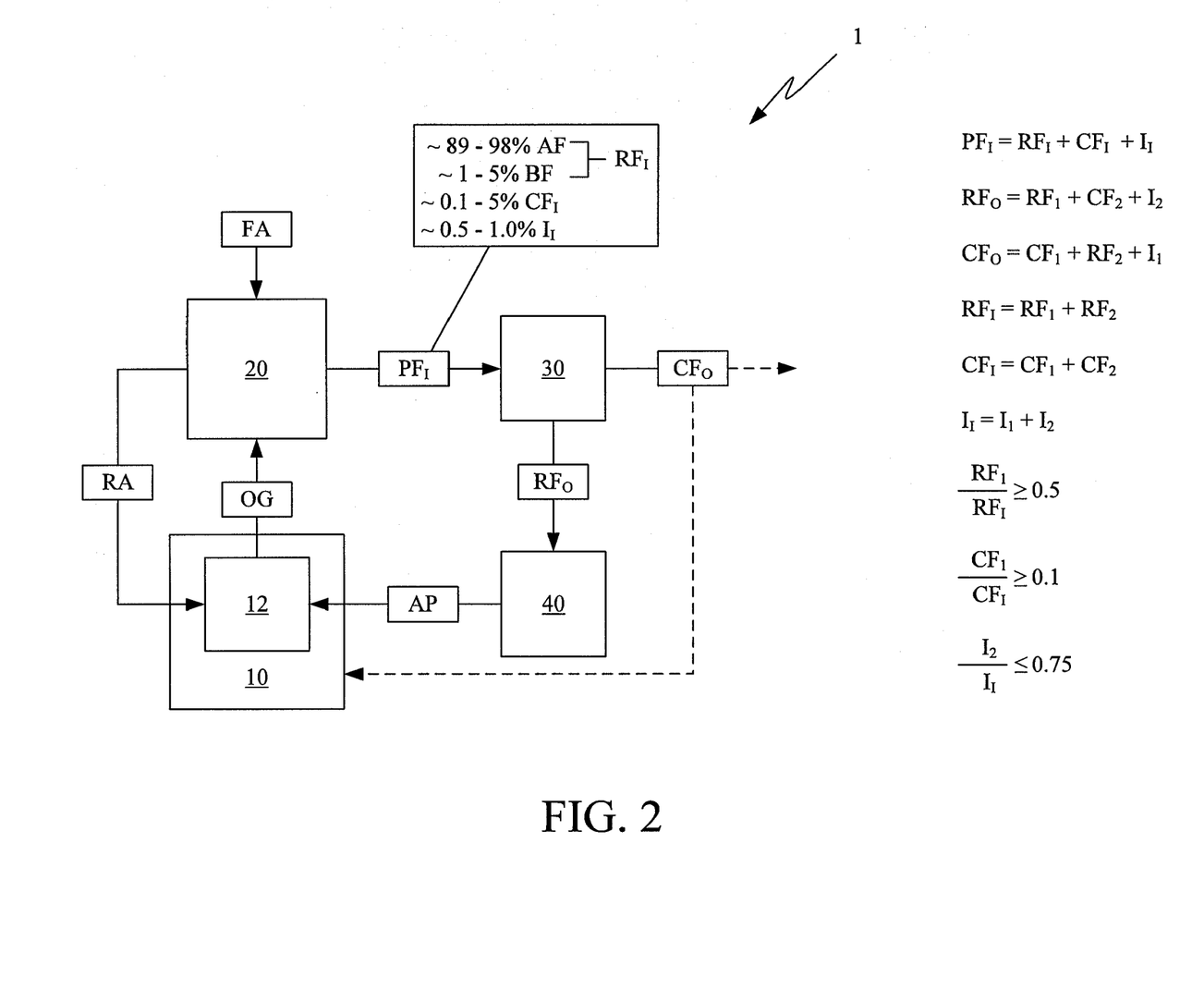
FIG. 2 is a schematic view illustrating systems and methods for recovering recyclable fines in accordance with the present disclosure.

Referring now to FIG. 2, one embodiment of a system 1 useful in accordance with the present disclosure includes a potline 10 having a plurality of aluminum electrolysis cells 12. The aluminum electrolysis cells 12 produce off-gases (OG), which are sent to a gas treatment center 20. The gas treatment center receives fresh alumina (FA) for treating the off-gases (OG) and discharges reacted alumina (RA), which is sent back to the potline 10 for use as a feed stream for the aluminum electrolysis cells 12.

The gas treatment center (20) discharges a particulate fines stream ($PF_1$) containing recyclable fines (RF), and carbon fines (CF). The recyclable fines (RF) generally include alumina fines (AF) and may include bath fines (BF). The particulate fines (PF) are sent to a fines separator 30 via the particulate fines inlet stream ($PF_I$), sometimes referred to herein as a particulate fines feed stream. The fines separator 30 separates least some of the recyclable fines (RF) and at least some of the carbon fines (CF) from one another, as described in further detail below. The recyclable fines (RF) may be discharged from the fines separator 30 as recyclable fines outlet stream ($RF_O$). The waste carbon fines may be discharged from the fines separator 30 as carbon fines outlet stream ($CF_O$).

The recyclable fines outlet stream ($RF_O$) may be sent to an agglomerator 40, which agglomerates the recyclable fines (RF) into an agglomerated product (AP), as described in further detail below. The agglomerated product may then be sent to the potline 10 for use as a feed stream for the aluminum electrolysis cells 12, or for other suitable purposes. Alternatively, the agglomerated product (AP) may be sent to the gas treatment center 20 for use in treating off-gases (OG) (embodiment not illustrated), or for other suitable purposes.

The carbon fines outlet stream ($CF_O$), which may include an organic liquid, may be discharged to a suitable disposal facility, or may be re-used in the potline 10. For example, the carbon fines outlet stream ($CF_O$) may be used as a fuel. In one embodiment, the carbon fines outlet stream ($CF_O$) may be used to heat one or more materials associated with the aluminum electrolysis cells 12. For example, the carbon fines outlet stream ($CF_O$) may be used to heat one or more anodes of the aluminum electrolysis cells 12, such as during production of pre-baked carbon anodes.

As noted above, particulate fines are included in the feed stream to the fines separator 32. Particulate fines are particles having maximum diameter of not greater than 45 microns. Particulate fines may have an average diameter of not greater than about 20 microns. Examples of particulate fines includes carbon fines and recyclable fines. In one embodiment, the particulate fines comprise superfines, which have a maximum diameter of not greater than about 25 micros. In one embodiment, particulate fines have a maximum diameter of not greater than about 40 microns. In other embodiments, particulate fines may have a maximum diameter of not greater than about 35 microns, or not greater than about 30 microns, or not greater than about 25 microns. In one embodiment, the particulate fines have an average diameter of not greater than about 18 microns. In other embodiments, the particulate fines have an average diameter of not greater than about 15 microns, or not greater than about 10 microns. Particulate fines generally have an average diameter of at least about 0.5 microns.

Carbon fines (CF) are particulate fines comprising mainly carbon. Carbon fines (CF) may be contained in off-gases (OG) of an aluminum electrolysis cell 12. Recyclable fines (RF) are particulate fines that are suited for return to or use in an aluminum electrolysis cell 12 and/or a gas treatment center 20. Examples of recyclable fines (RF) are alumina fines (AF) and bath fines (BF). Alumina fines (AF) are particulate fines comprising mainly alumina ($Al_2O_3$). For example, alumina fines may be produced in a gas treatment center 20, such as due to break-up of fresh alumina (FA) in the gas treatment center 20. Bath fines (BF) are particulate fines comprising mainly electrolytic bath, such as particulate fines of $NaAlF_4$.

An aluminum electrolysis cell 12 is a container containing an electrolyte through which an electric current is passed via a system of electrodes (e.g., an anode and a cathode) in order to change the composition of a material. For example, an aluminum compound (e.g., $Al_2O_3$) may be decomposed into pure aluminum metal (Al) via an electrolysis cell 12. Off-gases (OG) are fumes produced from an aluminum electrolysis cell 12. Off-gases generally contain $CO_2$ and air, as well as gaseous fluoride (e.g., HF), bath fines, and carbon fines, among other things.

A gas treatment center 20 is an apparatus, system or device that purposefully removes particulate matter and/or one or more impurities from industrial exhaust streams. For example, a gas treatment center 20 may remove substances, such as hydrogen fluoride (HF) or dusts (e.g., bath fines, carbon fines), to name two, from aluminum electrolysis cell off-gases (OG). A gas treatment center 20 may include one or more scrubbers (not illustrated) and/or one or more dust collectors (not illustrated). With respect to aluminum electrolysis cells 12, a gas treatment center may discharge a reacted alumina stream (RA) and a particulate fines stream ($PF_I$). The reacted alumina stream (RA) may be supplied to the aluminum electrolysis cells 12 as a feed stream. The particulate fines stream ($PF_I$) may be supplied to a fines separator 30, as described herein.

A scrubber purposefully removes at least some unwanted constituents from exhaust streams. Examples of scrubbers include dry scrubbers and wet scrubbers. A dust collector collects small particulate matter, such as particulate fines. A dust may include a blower, dust filter, filter-cleaning system, and/or a dust receptacle or dust removal system. In embodiments of the present disclosure, a dust collector may collect particulate fines and discharge a particulate fines stream ($PF_I$) to a fines separator 30, as described herein.

As noted above, the recyclable fines outlet stream ($RF_O$) may be sent to an agglomerator 40, which agglomerates the recyclable fines (RF) into an agglomerated product (AP), as described in further detail below. In one embodiment, the agglomerated product (AP) is used as a recycled feedstock. A recycled feedstock is a feedstock comprising recycled fines (RF) suited for use in industrial processes, such as, for example, a gas scrubbing operation, or as a feed stream for an aluminum electrolysis cell 12. In one embodiment, a recycled feedstock is produced from recyclable fines (RF). In some instances, the recycled feedstock includes agglomerated alumina fines and bath fines.

Agglomerating and the like means to form into a ball-shaped mass. Agglomeration of recyclable fines (RF) in the agglomerator 40 may be accomplished via conventional processes, such as spray drying and the like. Generally, the agglomerated product (AP) should have an average particle size of at least about 90 microns and/or a maximum diameter of not greater than 160 microns to facilitate re-use in aluminum smelting operations.

With continued reference to FIG. 2, the fines separator 30 is generally capable of removing a high amount of carbon fines (CF) and/or impurities (I) from the particulate fines (PF), as described below. In one embodiment, a removal efficiency (RE) of at least about 10% is achieved via the fines separator 30. For example, the inlet particulate fines feed stream may include recyclable fines (e.g., about 94-99.4 wt. %, which is made up of about 89-98 wt. % alumina fines and 1-5 wt. % bath fines), carbon fines (e.g., 0.1-5 wt. %) and impurities (about 0.5-1 wt. %). This may be represented as $PF_I = RF_I + CF_I + I_I$, where $PF_I$ is the particulate fines inlet stream to the fines separator 30, $RF_I$ is the total mass of recyclable fines in the particulate fines inlet stream, $CF_I$ is the total mass of carbon fines in the particulate fines inlet stream, and $I_I$ is the total mass of impurities in the particulate fines inlet stream. A recyclable fines outlet stream ($RF_O$) may include recovered recyclable fines ($RF_1$), residual carbon fines ($CF_2$), and residual impurities, i.e., $RF_O = RF_1 + CF_2 + I_2$. A carbon fines outlet stream ($CF_O$) may include waste carbon fines ($CF_1$), waste impurities ($I_1$) and lost recyclable fines ($RF_2$), i.e., $CF_O = CF_1 + RF_2 + I_1$. In this instance, the removal efficiency (RE) of the fines separator 30 is:

$$RE = RF_1/RF_I - (CF_2 + I_2)/(CF_I + I_I)$$

In one embodiment, a least a 10% removal efficiency is achieved by the fines separator 30. In other embodiments, at least a 25% removal efficiency is achieved, or at least a 40% removal efficiency is achieved, or at least a 50% removal efficiency is achieved, or at least a 60% removal efficiency is achieved, or at a least 70% removal efficiency is achieved, or at least a 75% removal efficiency is achieved, or at least an 80% removal efficiency is achieved, or at least a 90% removal efficiency is achieved, or at least a 95% removal efficiency is achieved by the fines separator 30.

For example, and by way of illustration only, a particulate fines inlet stream ($PF_I$) may include 93 grams of alumina fines, 4 grams of bath fines 2.5 grams of carbon fines, and 0.5 grams of impurities. An outlet recyclable fines stream ($RF_O$) may include 91 grams of alumina fines, 3 grams of bath fines, 0.75 gram of carbon fines and 0.25 gram of impurities. In this illustrative example, the removal efficiency RE would be:

$$RE = (91+3)/(93+4) - (0.75+0.25)/(2.5+0.5) = 63.6\%$$

The fines separator 30 may achieve a high recycled fines mass ratio ($RF_1/RF_I$) in the recycled fines outlet stream ($RF_O$). As illustrated in FIG. 2, the mass of recycled fines ($RF_1$) in the recycled fines outlet stream ($RF_O$) may be at least 50% of the total recycled fines ($RF_I$) in the particulate fines inlet stream ($PF_I$). In other words, $RF_1/RF_I \geq 0.5$, or at least 50% of the recycled fines from the particulate fines inlet stream ($PF_I$) are recovered in the recycled fines outlet stream ($RF_O$). Stated differently, not greater than 50% of the recycled fines from the particulate fines inlet stream ($PF_I$) are included in the carbon fines outlet stream ($CF_O$). In some embodiments, the recycled fines mass ratio ($RF_1/RF_I$) is at least about 0.55. In other embodiments, the recycled fines mass ratio ($RF_1/RF_I$) is at least about 0.60, or at least about 0.65, or at least about 0.70, or at least about 0.75, or at least about 0.80, or at least about 0.85, or at least about 0.90, or at least about 0.95, or at least about 0.98. Naturally, the higher the recycled fines mass ratio ($RF_1/RF_I$), the better the removal efficiency of the fines separator 30, as illustrated above.

The fines separator 30 may achieve a high carbon fines mass ratio ($CF_1/CF_I$) in the carbon fines outlet stream ($CF_O$). As illustrated in FIG. 2, the mass of carbon fines ($CF_1$) in the carbon fines outlet stream ($CF_O$) may be at least 10% of the total carbon fines ($CF_I$) in the particulate fines inlet stream ($PF_I$). In other words, $CF_1/CF_I \geqq 0.1$, or at least 10% of the carbon fines from the particulate fines inlet stream ($PF_I$) are included in the carbon fines outlet stream ($CF_O$). Stated differently, not greater than 90% of the carbon fines from the particulate fines inlet stream ($PF_I$) are included in the recycled fines outlet stream ($RF_O$). In some embodiments, the carbon fines mass ratio ($CF_1/CF_I$) is at least about 0.20. In other embodiments, the carbon fines mass ratio ($CF_1/CF_I$) is at least about 0.30, or at least about 0.35, or at least about 0.40, or at least about 0.45, or at least about 0.50, or at least about 0.55, or at least about 0.60, or at least about 0.65, or at least about 0.70, or at least about 0.75, or at least about 0.80, or at least about 0.85, or at least about 0.90, or at least about 0.95, or at least about 0.98. Naturally, the higher the carbon fines mass ratio ($CF_1/CF_I$) in the carbon fines outlet stream ($CF_O$), the better the removal efficiency of the fines separator 30, as illustrated above.

The fines separator 30 may achieve a low impurity mass ratio in the ($I_2/I_I$) in the recycled fines outlet stream ($RF_O$). As illustrated in FIG. 2, the mass of impurities ($I_2$) in the recycled fines outlet stream ($RF_O$) may be not greater than 75% of the total impurities ($I_I$) in the particulate fines inlet stream ($PF_I$). In other words, $I_2/I_I \leqq 0.75$, or at least 25% of the impurities from the particulate fines inlet stream ($PF_I$) are removed. Stated differently, at least 25% of the impurities are included in the carbon fines outlet stream ($CF_O$), i.e., $I_1/I_I \geqq 0.25$. This may due to an attraction of the impurities to the carbon fines. In some embodiments, the impurities comprise or consist essentially of Fe, Ni, V, Ti, S and P, and combinations thereof. In some embodiments, the impurities mass ratio ($I_2/I_I$) in the recycled fines outlet stream ($RF_O$) is not greater than about 0.70. In other embodiments, the impurities mass ratio ($I_2/I_I$) is not greater than about 0.65, or not greater than about 0.60, or not greater than about 0.55, or not greater than about 0.50, or not greater than about 0.45, or not greater than about 0.40, or not greater than about 0.35, or not greater than about 0.30, or not greater than about 0.25, or not greater than about 0.20, or not greater than about 0.15, or not greater than about 0.10, or not greater than about 0.05. Naturally, the lower the impurities mass ratio ($I_2/I_I$) in the recycled fines outlet stream ($RF_O$), the better the removal efficiency of the fines separator, as illustrated above.

Figure 3:
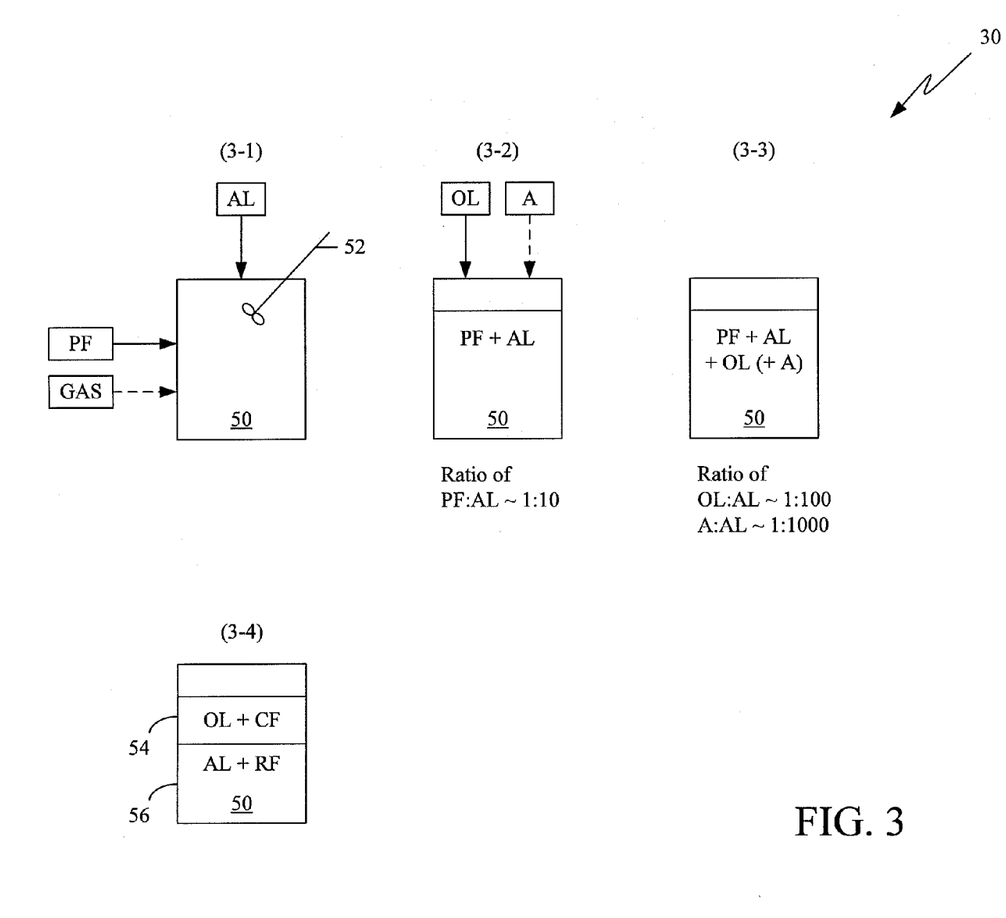
FIG. 3 is a schematic view illustrating one embodiment of a fines separator.

One embodiment of a fines separator 30 is illustrated in FIG. 3. In this embodiment, the fines separator 30 operates in a batch mode. In the illustrated embodiment, the fines separator includes a tank 50 having a mechanical agitator 52, such as a stirring rod, as illustrated in 3-1. In the illustrated embodiment, the tank 50 receives aqueous liquid (AL), particulate fines (PF), and optionally one or more gases. The particulate fines (PF) generally include recyclable fines (RF) and carbon fines (CF). The recyclable fines (RF) generally include alumina fines (AF) and bath fines (BF).

As illustrated in 3-2, the particulate fines (PF) and the aqueous (AL) are mixed in the mixing tank 50 to produce a first mixture, for example, a slurry comprising the aqueous liquid (AL) and the particulate fines (PF). Concomitant to the mixing of the particulate fines (PF) and the aqueous liquid (AL), an organic liquid (OL) and an optional additive (A) may be added to the tank 50. The organic liquid (OL) generally has a different density and/or has a different polarity and/or different surface tension than that of the aqueous liquid (AL). Concomitant to the addition of these materials, the mechanical agitator 52 may continue to mix the mixture, as illustrated in 3-3. In one embodiment, a colloid, such as an emulsion, is created. During the mixing, the mixture may include the particulate fines (PF), the aqueous liquid (AL), the organic liquid (OL), and optionally the additive (A).

Upon mixing the mixture for a satisfactory amount of time, such as a few minutes, the mixture may be allowed to settle, upon which time a first layer 54 comprising a predominate amount of organic liquid and a second layer 56 comprising a predominate amount of aqueous liquid may form, as illustrated in 3-4 (e.g., due to the differences in density and/or polarity and/or surface tension between the organic liquid and the aqueous liquid). At least some of the carbon fines (CF) are contained in the first layer 54. At least some of the recyclable fines (RF) are contained in the second layer 56. Thus, removal of carbon fines (CF) and/or impurities from the recyclable fines (RF) may be achieved.

By way of theory only, it is postulated that the carbon fines are at least partially contained in the organic liquid due to the similarity in polarity of the two materials. Likewise, by way of theory only, it is postulated that the recyclable fines are at least partially contained in the aqueous liquid due to the similarity in polarity of the two materials.

In the illustrated embodiment of FIG. 3, the organic liquid is added after the particulate fines and aqueous liquid mixture (e.g., a slurry) has been created. In other embodiments, the organic liquid, particulate fines, and aqueous liquid may be added at about the same time. In other embodiments, the particulate fines and organic liquid may be mixed, after which the aqueous liquid may be added. The optional additive may be added at any point during any of these mixing events, but is generally added when the organic liquid is added.

The tank 50 is a vessel able to contain one or more substances. A tank may have one or more bottom portions and one or more side portions. A tank may also have one or more top portions. A tank may have one or more openings (e.g., lids, side drains, bottom drains, overflow weirs) in any one or more of the bottom portions, side portions, or top portions. Materials (e.g., liquids) may be added or removed from the tank via one or more of these openings. In one embodiment, a tank is a mixing tank. In one embodiment, a tank is a settling tank. In one embodiment, a tank is both a mixing tank and a settling tank. A mixing tank is capable of mixing materials contained therein, such as by mechanical agitation (e.g., via stirring apparatus and/or shaking apparatus). A settling tank is capable of allowing materials to settle and/or separate therein.

The tank 50 may facilitate mixing. Mixing means to combine one substance together with another part of that substance, or with a different substance. For example, a solid may be mixed with a liquid to form a suspension (e.g., a slurry). In one example, particulate fines may be mixed with an aqueous liquid to form a first mixture. Mixing may also involve production of a colloid. For example, an aqueous liquid may be mixed with an organic liquid to form an emulsion. Due to the mixing of these liquids, carbon fines contained in the aqueous liquid may move into the organic liquid, thereby facilitating separation of at least some of the recyclable fines from the carbon fines. In some embodiments, the mixing is accomplished such that a gas (e.g., air) is introduced into one or more substances during the mixing. Use of gas within the liquid may facilitate separation of the carbon fines from the recyclable fines. Mixing may be accomplished via various conventional methods including mechanical agitation (e.g., stirring and/or shaking). Other mixing methodologies may be used.

A suspension is a fluid containing solid particles, and which may undergo sedimentation. A slurry is an example of a suspension, with insoluble particles (e.g., alumina fines, carbon fines) being contained within an aqueous liquid. A colloid is a stable system of two phases, with a first phase dispersed in a second phase, such a droplets or particles dispersed in a liquid phase. An example of a colloid is an emulsion. An emulsion is a colloid in which both phases are liquids. Over time substances in an emulsion may tend to separate. For example, an organic liquid (e.g., a petroleum based liquid) and an aqueous liquid (e.g., water) may tend to separate over time.

The aqueous liquid (AL) is a substance existing in the liquid state at room temperature and having molecules containing a predominate amount of water ($H_2O$). In one embodiment, an aqueous liquid has a higher density than an organic liquid. In one embodiment, the aqueous liquid includes mostly or all water. A predominate amount means to have a large amount relative to reference. For example, if a mixture contains 51% organic liquid and 49% aqueous liquid, the mixture would have a predominate amount of organic liquid.

The organic liquid (OL) is a substance existing in the liquid state at room temperature and having molecules containing a predominate amount of carbon. Organic liquids include hydrocarbon-based liquids, such as petroleum-derived liquids (e.g., petroleum-based oils). Petroleum-derived liquids are liquids mainly containing hydrocarbons of various molecular weights, and which are generally derived by extraction from the earth's crust. Some examples of petroleum-derived liquids include crude oil, which may be refined into gasoline, naphtha, and fuel oils, to name a few. In one embodiment, the organic liquid comprises one or more fuel oils. Fuel oils generally comprise mixtures of saturated hydrocarbons, aromatic hydrocarbons, and unsaturated hydrocarbons. Some examples of useful fuel oils include No. 1 Fuel Oil, and No. 2 Fuel Oil. These fuel oils generally have hydrocarbons having chain lengths of at least C9. One type of No. 1 Fuel Oil includes 70-80 wt. % saturated hydrocarbons, 17-25 wt. % aromatic hydrocarbons and 3-6 wt. % unsaturated hydrocarbons. One type of No. 2 Fuel Oil includes 54-85 wt. % saturated hydrocarbons, 15-45 wt. % aromatic hydrocarbons and 1-6 wt. % unsaturated hydrocarbons. No. 2 Fuel Oil may have hydrocarbons having chain lengths of at least C11. Generally, the organic liquid has a density that is either less than or greater than that of the aqueous liquid. In one embodiment, the organic liquid has a density that is less than that of the aqueous liquid.

Over time the aqueous liquid and the organic liquid may separate by dividing into parts. For example, an organic liquid may separate from an aqueous liquid passively over time, such as due differences in density and/or due to difference in polarity of the molecules and/or due to differences in surface tension, to name a few, of the two liquids. In this example, the organic liquid may form or be included in a first layer of a mixture and the aqueous layer may form or be included in a second layer of the mixture. Due to the separating, it may be possible to extract a predominate amount of one of these liquids from the mixture without extracting a predominate amount of the other one of these liquids from the mixture. A mixture may be separated in a centrifuge; liquid of higher density will tend to move to the outside of the centrifuge while less dense liquid will tend to remain in the center.

As noted above, an optional additive (A) may be added to the tank 50 to facilitate separation of carbon fines (CF) and recyclable fines (RF). An additive is a material added to a composition to facilitate an outcome. For example, an additive may be added to a liquid to facilitate movement of carbon fines into an organic liquid and/or retention of carbon fines in an organic liquid. An additive may be added to a liquid to facilitate retention of recyclable fines in an aqueous liquid and/or movement of recyclable fines into an aqueous liquid. Additives useful in accordance with the instant disclosure include alcohols, ethers and keytones. In one embodiment, the additive is a carbinol form of alcohol. A carbinol is any compound having a chemical structure similar to methanol retaining the COH radical and in which hydrocarbon radicals may be substitute for the hydrogen originally attached to the carbon atom. In one embodiment, the additive is methyl isobutyl carbinol (MIBC).

The optional gas introduced into the tank 50 may be any suitable gas that facilitates a creation of a colloid. In one embodiment, the gas comprises mostly air. Other gases may be used. In some embodiments, the mixing apparatus 52 may facilitate introduction of the gas into the tank, such as by stirring at a sufficiently high rate so as to induce movement of the gas into the liquid.

With continued reference to FIG. 3, the ratio of the particulate fines (PF) to aqueous liquid (AL) may be useful in facilitating a high removal efficiency of the fines separator 30. In one embodiment, the ratio of the mass of the particulate fines (PF) to the volume of the aqueous liquid (AL) is at least about 1:1.5 (PF:AL). In other embodiments, the mass-to-volume ratio of the particulate fines (PF) to the aqueous liquid (AL) is at least about 1:2, or at least about 1:3, or at least about 1:4, or at least about 1:5, or at least about 1:6, or at least about 1:7, or at least about 1:8 (PF:AL). In one embodiment, the mass-to-volume ratio of particulate fines (PF) to aqueous liquid (AL) is not greater than 1:20 (PF:AL). In other embodiments, the mass-to-volume ratio of the particulate fines (PF) to the aqueous liquid (AL) is not greater than about 1:19, or not greater than about 1:18, or not greater than about 1:17, or not greater than about 1:16, or not greater than about 1:15, or not greater than about 1:14, or not greater than about 1:13, or not greater than about 1:12 (PF:AL). In one embodiment, the mass-to-volume ratio of particulate fines (PF) to aqueous liquid (AL) is about 1:10 (PF:AL).

The ratio of organic liquid (OL) to aqueous liquid (AL) may be useful in facilitating a high removal efficiency of the fines separator 30. In one embodiment, the volumetric ratio of the organic liquid (OL) to the aqueous liquid (AL) is at least about 1:10 (OL:AL). In other embodiments, the volumetric ratio of the organic liquid (OL) to the aqueous liquid (AL) is at least about 1:20, or at least about 1:30, or at least about 1:40, or at least about 1:50, or at least about 1:60, or at least about 1:70, or at least about 1:80 (OL:AL). In one embodiment, the volumetric ratio of the organic liquid (OL) to the aqueous liquid (AL) is not greater than about 1:200 (OL:AL). In other embodiments, the volumetric ratio of the organic liquid (OL) to the aqueous liquid (AL) is not greater than about 1:190, or not greater than about 1:180, or not greater than about 1:170, or not greater than about 1:160, or not greater than about 1:150, or not greater than about 1:140, or not greater than about 1:130, or not greater than about 1:120

(OL:AL). In one embodiment, the volumetric ratio of the organic liquid (OL) to the aqueous liquid (AL) is about 1:100 (OL:AL).

The ratio of the additive (A), when used, to the aqueous liquid (AL), may be useful in facilitating a high removal efficiency of the fines separator 30. In one embodiment, the volumetric ratio of the additive (A) to the aqueous liquid (AL) is at least about 1:10 (A:AL). In other embodiments, the volumetric ratio of the additive (A) to the aqueous liquid (AL) is at least about 1:50, or at least about 1:100, or at least about 1:200, or at least about 1:300, or at least about 1:400, or at least about 1:500, or at least about 1:600, or at least about 1:700, or at least about 1:800 (A:AL). In one embodiment, the volumetric ratio of the additive (A) to the aqueous liquid (AL) is not greater than 1:2000 (A:AL). In other embodiments, the volumetric ratio of the additive (A) to the aqueous liquid (AL) is not greater than about 1:1900, or not greater than about 1:1800, or not greater than about 1:1700, or not greater than about 1:1600, or not greater than about 1:1500, or not greater than about 1:1400, or not greater than about 1:1300, or not greater than about 1:1200 (A:AL). In one embodiment, the volumetric ratio of the additive to the aqueous liquid is about 1:1000 (A:AL).

Figure 4:
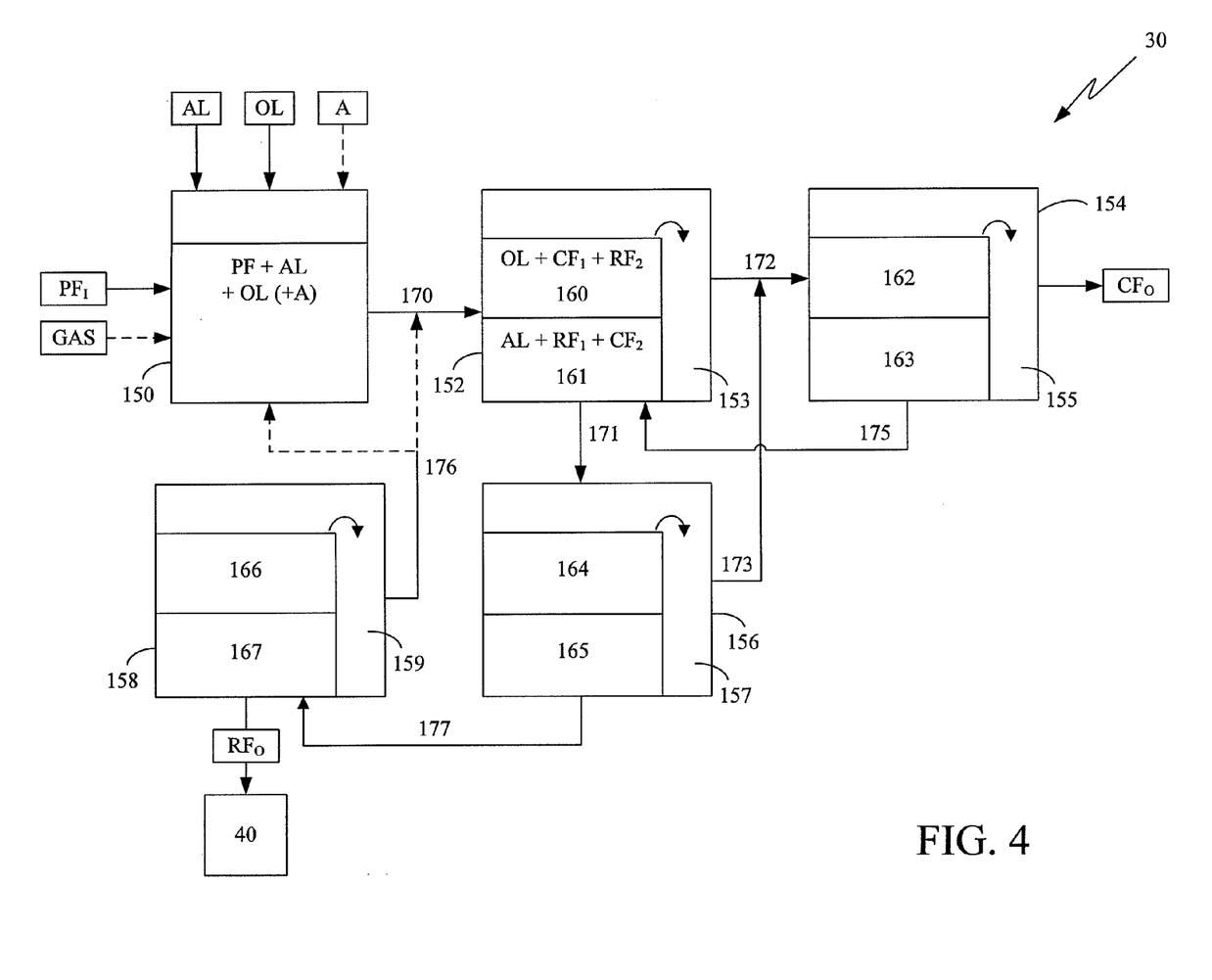
FIG. 4 is a schematic view illustrating another embodiment of a fines separator.

Referring now to FIG. 4, another embodiment of a fines separator 30 is illustrated. In this embodiment, a continuous fines separation process is illustrated. In the illustrated embodiment, the fines separator 30 is a cascade process where organic liquid (OL) from one tank may overflow and move into another tank to facilitate separation operations. Similarly, aqueous liquid (AL) of one tank may be extracted (e.g., via valves and piping) from one tank into another tank to facilitate separation operations.

In the illustrated embodiment, a first tank 150 may receive a particulate fines inlet stream ($PL_I$), an aqueous liquid (AL), an organic liquid (OL), an optional additive (A) and/or optional gas. As described above, these ingredients may be mixed in any suitable order or arrangement. In one embodiment, the particulate fines inlet stream ($PF_I$) and aqueous liquid (AL) are introduced in the tank 150 followed by the organic liquid (OL) and optional additive (A), followed by the introduction of optional gas, such as via mixing operations. After mixing for an appropriate duration, this mixture may be sent to a second tank 152, as illustrated via stream 170.

The second tank 152 may be a settling tank. In the second tank 152, a first layer 160 and a second layer 161 may form, such as due to the effects described above relative to FIG. 3 (e.g., differing densities and/or polarity and/or surface tension). The first layer 160 may includes liquid, which may be a predominate amount of organic liquid (OL), and a first portion of carbon fines ($CF_1$). The first layer 160 may include some recyclable fines ($RF_2$), but it is preferred that these recyclable fines ($RF_2$) are contained within the second liquid layer 161. The second liquid layer 161 generally includes liquid, which may be a predominate amount of aqueous liquid (AL), and some recyclable fines ($RF_1$). The second layer 161 may include some carbon fines ($CF_2$), but it is preferred that these carbon fines ($CF_2$) are included in the first liquid layer 160. As additional liquid flows into tank 152, some of the first liquid layer 160 may overflow into overflow partition 153, and may subsequently flow into third tank 154, as illustrated by stream 172. Similarly, some of the second liquid layer 161 may move into a fourth tank 156 via suitable valving and/or piping arrangements, as illustrated by stream 171.

In the third tank 154, which may be a settling tank, two layers may form, a first layer 162 having a first density and/or first polarity and/or first surface tension (e.g., due to the presence of organic liquid), and second layer 163 having a second density and/or second polarity and/or a second surface tension (e.g., due to the presence of aqueous liquid). As liquid flows into this third tank 154, some of the first layer 162 may overflow into overflow partition 155 and exit the third tank 154 as carbon fines outlet stream ($CF_O$). The second liquid layer 163 may be recycled to the second tank 152 via stream 175.

In the fourth tank 156, which may be a settling tank, two layers of liquid may form, a first liquid layer 164 having a first density and/or first polarity and/or first surface tension (e.g., due to the presence of organic liquid), and second layer 165 having a second density and/or second polarity and/or a second surface tension (e.g., due to the presence of aqueous liquid). As liquid flows into this fourth tank 156, some of the first layer 164 may overflow into overflow partition 157 and exit the tank via stream 173, which may combine with stream 172 and enter third tank 154. The second liquid layer 165 may be sent to a fifth tank 158 via stream 177.

In fifth tank 158, which may be a settling tank, two layers of liquid may form, a first liquid layer 166 having a first density and/or first polarity and/or first surface tension (e.g., due to the presence of organic liquid), and second layer 167 having a second density and/or second polarity and/or a second surface tension (e.g., due to the presence of aqueous liquid). As liquid flows into this fifth tank 158, some of the first layer 166 may overflow into overflow partition 159 and exit the tank via stream 176, which may combine with stream 170 and enter second tank 152. The second liquid layer 167 may exit tank 158 as recyclable fines outlet stream ($RF_O$). As described above with respect to FIG. 2, this recyclable fines outlet stream ($RF_O$) may be sent to agglomerator 40 to facilitate agglomeration of the recyclable fines product. The agglomerated produced (AP) may be returned to the potline 10 and/or gas treatment center 20, as described above.

Due to the cascade arrangement of FIG. 4, the recyclable fines outlet stream ($RF_O$) may have a high recyclable fines mass ratio ($RF_1/RF_I$), such as at least about 0.70, or any other recyclable fines mass ratio values described above relative to FIG. 2. Due to the cascade arrangement of FIG. 4, the carbon fines outlet stream ($CF_O$) may have a high carbon fines mass ratio ($CF_1/CF_I$), such as at least about 0.5, or any other carbon fines mass ratio values described above relative to FIG. 2.

EXAMPLE 20 grams of particulate fines are collected from a gas treatment center. An XRF analysis is performed on the particulate fines, the results of which are provided in Table 1, below.

TABLE 1

| XRF Analysis of Particulate Fines | | |
|---|---|---|
| Constituent | Mass (g) | Percent of Particulate Fines |
| Carbon fines | 0.50 | 2.5 wt. % |
| Fe | 0.02 | 0.1 wt. % |
| Ni | 0.02 | 0.1 wt. % |
| V | 0.004 | 0.02 wt. % |
| S | 0.06 | 0.3 wt. % |
| P | 0.006 | 0.03 wt. % |
| Recyclable fines | 19.39 | 96.95 wt. % |

A lab-scale test is conducted. The 20 grams of particulate fines are mixed with about 200 ml of water to make a slurry. The particulate fines include recyclable fines and carbon fines. About 1 ml of an organic liquid (No. 2 Fuel Oil) and about 1 ml of an additive (methyl isobutyl carbinol) are added to the slurry. The mixture is stirred for about 4 minutes. After mixing, the mixture separates into two liquid layers—a top layer comprising mostly organic liquid and some carbon fines, and a bottom layer comprising mostly aqueous liquid and recyclable fines. The top layer is manually removed.

An additional 1 ml of organic liquid and 1 ml of additive are added, and the mixture is stirred for 4 minutes. Again, after mixing, the mixture separates into two liquid layers—a top layer comprising mostly organic liquid and some carbon fines and a bottom layer comprising mostly aqueous liquid and recyclable fines. The top layer is manually removed.

An additional 1 ml of organic liquid and 1 ml of additive are added, and the mixture is stirred for 4 minutes. Again, after mixing, the mixture separates into two liquid layers—a top layer comprising mostly organic liquid and some carbon fines and a bottom layer comprising mostly aqueous liquid and recyclable fines. The top layer is manually removed.

An additional 1 ml of organic liquid and 1 ml of additive are added, and the mixture is stirred for 4 minutes. Again, after mixing, the mixture separates into two liquid layers—a top layer comprising mostly organic liquid and some carbon fines and a bottom layer comprising mostly aqueous liquid and recyclable fines. The top layer is manually removed.

The four collected top layers are combined and dried overnight at 100° C., collecting a total weight of 0.7 grams of carbon fines. An XRF analysis is completed on the recovered carbon fines, the results of which are provided in Table 2, below.

TABLE 2

XRF Analysis of Recovered Carbon Fines Product

| Constituent | Mass (g) | Percent of Carbon Fines Product | Concentration Increase Over Particulate Fines |
|---|---|---|---|
| Carbon fines | 0.406 | 58 wt. % | 23.2X |
| Fe | 0.014 | 2 wt. % | 20X |
| Ni | 0.0119 | 1.7 wt. % | 17X |
| V | 0.0014 | 0.2 wt. % | 10X |
| S | 0.0084 | 1.2 wt. % | 4X |
| P | 0.00161 | 0.23 wt. % | 5.75X |
| Recyclable fines | 0.25669 | 36.67 wt. % | N/A |

The lab-scale test achieves a removal efficiency (RE) of:

$$RE = RF_1/RF_I - (CF_2 + I_2)/(CF_I + I_I)$$
$$= (19.13331)/19.39 - (0.094 + 0.0726)/(0.5 + 0.11)$$
$$= 98.68\% - 27.33\%$$
$$= 71.35\% \text{ removal efficiency}$$

As may be appreciated, many of the above-described systems and/or apparatus may be utilized in conjunction with many of the above-described methods, and vice-versa, and any of such useful combinations are expressly within the scope and spirit of the present disclosure. Furthermore, while the fines separation systems, methods and apparatus of the present disclosure have been generally described relative to aluminum electrolysis cells, it is contemplated that the fines separation systems and methods of the present disclosure could be utilized with various other electrolysis cell types, such as, without limitation, lead, magnesium, zinc, zirconium, titanium and silicon electrolysis cells, as appropriate. Additionally, while the use of an aqueous liquid and organic liquid have been used to describe the removal methodology, it is anticipated that, in some instances, the first and second liquids could both be aqueous, or the first and second liquids could both be organic. Furthermore, while two liquid layers have been used to describe the removal methodology, it is anticipated that more than two layers, such as three, four, or more layers could be utilized. It is also understood that, due to the principles of equilibrium, thermodynamics and the like, each layer may not be purely aqueous or purely organic, and that each layer may include small, or even considerable, amounts of the other type of liquid, and that the terms aqueous liquid and organic liquid are used for illustrative purposes only.

While various embodiments of the present disclosure have been described in detail, it is apparent that modifications and adaptations of those embodiments will occur to those skilled in the art. However, it is to be expressly understood that such modifications and adaptations are within the spirit and scope of the present disclosure.

What is claimed is:

1. A method comprising:
   (a) feeding a particulate fines feed stream to a tank;
      wherein the particulate fines feed stream comprises particulate fines (PF);
      wherein the particulate fines comprise inlet carbon fines ($CF_I$) and inlet recyclable fines ($RF_I$);
      wherein the inlet recyclable fines ($RF_I$) comprise alumina fines (AF);
   (b) mixing the particulate fines (PF) with liquid;
      wherein the liquid comprises a first liquid and a second liquid; and
   (c) separating at least some of the first liquid from at least some of the second liquid;
      wherein the first liquid comprises a recovered recyclable fines portion ($RF_1$);
      wherein the second liquid comprises a waste carbon fines portion ($CF_1$);
      wherein the mass ratio of the recovered recyclable fines portion ($RF_1$) to the inlet recyclable fines ($RF_I$) is at least about 0.5; and
      wherein the mass ratio of the waste carbon fines portion ($CF_1$) to the inlet carbon fines ($CF_I$) is at least about 0.1.

2. The method of claim 1, wherein the mass ratio of the recovered recyclable fines portion ($RF_1$) to the inlet recyclable fines ($RF_I$) is at least about 0.70.

3. The method of claim 2, wherein the mass ratio of the waste carbon fines portion ($CF_1$) to the inlet carbon fines ($CF_I$) is at least about 0.50.

4. The method of claim 3, wherein the liquid further comprises an additive, wherein the additive at least facilitates achievement of the $CF_1$:$CF_I$ mass ratio of at least 0.50.

5. The method of claim 4, wherein the additive comprises a carbinol.

6. The method of claim 4, wherein the additive is methyl isobutyl carbinol.

7. The method of claim 1, wherein the first liquid is an aqueous liquid, and wherein the second liquid is an organic liquid.

8. The method of claim 1 comprising:
   producing recycled feedstock from the recovered recyclable fines portion.

9. The method of claim 8, wherein the producing comprises:
   agglomerating the recovered recyclable fines portion to produce the recycled feedstock.

10. The method of claim 9, comprising:
supplying the recycled feedstock to an aluminum electrolysis cell.

11. The method of claim 1, wherein the feeding step (a) comprises:
moving the particulate fines from a gas treatment center to the tank;
wherein, during the moving, the tank at least includes an aqueous liquid; and
wherein the gas treatment center is associated with at least one aluminum electrolysis cell.

12. The method of claim 1, wherein the mixing step (b) comprises:
forming an emulsion, wherein during the mixing, at least some of the carbon fines are retained in the second liquid.

13. The method of claim 1, comprising:
utilizing the waste carbon fines portion as at least a portion of a fuel.

14. The method of claim 13, wherein the utilizing comprises:
heating at least one anode associated with an aluminum electrolysis cell.

15. The method of claim 1, wherein the second liquid is a petroleum based liquid.

16. The method of claim 15, wherein the petroleum based liquid comprises hydrocarbons having chain lengths of at least C9.

17. The method of claim 15, wherein the petroleum based liquid comprises at least one of No. 1 Fuel Oil and No. 2 Fuel Oil.

18. The method of claim 1, wherein, wherein the particulate fines feed stream comprises inlet impurities ($I_I$), wherein the first liquid comprises a recovered impurities portion ($I_2$), and wherein the ratio of the recovered impurities portion $I_2$ to inlet impurities ($I_I$) is not greater than about 0.75;
wherein the impurities are selected from the group consisting of Fe, Ni, V, Ti, S and P.

* * * * *